US010001403B2

(12) United States Patent
Brouhard et al.

(10) Patent No.: US 10,001,403 B2
(45) Date of Patent: Jun. 19, 2018

(54) SYSTEM AND METHOD OF ENCODING ITEM INFORMATION FROM A SCALE IN A SELF-SERVICE SCANNING SOLUTION

(71) Applicant: Catalina Marketing Corporation, St. Petersburg, FL (US)

(72) Inventors: Jesse Brouhard, Sharon, MA (US); Michael Grimes, Brookline, MA (US)

(73) Assignee: CATALINA MARKETING CORPORATION, St. Petersburg, FL (US)

( * ) Notice: Subject to any disclaimer, the term of this patent is extended or adjusted under 35 U.S.C. 154(b) by 116 days.

(21) Appl. No.: 14/742,993

(22) Filed: Jun. 18, 2015

(65) Prior Publication Data

US 2015/0285671 A1  Oct. 8, 2015

Related U.S. Application Data

(63) Continuation of application No. 14/137,285, filed on Dec. 20, 2013, now Pat. No. 9,062,999.

(60) Provisional application No. 61/798,633, filed on Mar. 15, 2013.

(51) Int. Cl.
*G01G 23/44* (2006.01)
*G06K 19/06* (2006.01)
*G06Q 10/08* (2012.01)

(52) U.S. Cl.
CPC ....... *G01G 23/44* (2013.01); *G06K 19/06112* (2013.01); *G06Q 10/087* (2013.01)

(58) Field of Classification Search
CPC . G01G 23/44; G06K 19/06112; G06Q 10/087
See application file for complete search history.

(56) References Cited

U.S. PATENT DOCUMENTS

| 4,712,929 | A | 12/1987 | Kitaoka | 400/76 |
| 4,928,229 | A | 5/1990 | Teraoka et al. | 364/464.01 |
| 4,932,485 | A | 6/1990 | Mori | 177/25.15 |
| 5,806,045 | A | 9/1998 | Biorge et al. | 705/14 |
| 6,471,125 | B1 | 10/2002 | Addy | 235/385 |
| 6,571,223 | B1 | 5/2003 | Vaghi | 705/401 |

(Continued)

FOREIGN PATENT DOCUMENTS

EP  2 463 631  6/2012

*Primary Examiner* — Natalie Huls
(74) *Attorney, Agent, or Firm* — McDermott Will & Emery LLP (57) ABSTRACT

This invention relates to a system including a scale that weighs an item placed on the scale and encodes the weight and/or other item information into a machine readable code. The system may include a display that is coupled to the scale and displays the machine readable code. The scale may encode the item in Quick Response (QR) code format, Universal Product Code (UPC) format, and/or other computer-readable format. A mobile device may take a picture of or otherwise scan the machine readable code to determine the weight and/or other information encoded therein. The system may include a wireless transmitter that wirelessly transmits the weight. The mobile device may include a wireless receiver that wirelessly receives the weight transmitted from the scale. The mobile device may execute a self-scan application that uses the de-encoded or otherwise obtained weight for pricing the item based on the weight or other purposes.

20 Claims, 3 Drawing Sheets

(56) References Cited

U.S. PATENT DOCUMENTS

| | | |
|---|---|---|
| 6,810,355 B1 | 10/2004 | Kreidler et al. ............... 702/173 |
| 7,026,556 B1 | 4/2006 | Schuller ..................... 177/25.15 |
| 7,240,841 B2 | 7/2007 | Kelley et al. ............ 235/462.01 |
| 7,261,235 B2 | 8/2007 | Barenburg et al. ........... 235/375 |
| 7,375,294 B2 | 5/2008 | Kraft ......................... 177/25.15 |
| 8,249,928 B2 | 8/2012 | Schuller et al. ........... 705/14.38 |
| 2002/0020748 A1 | 2/2002 | Gu et al. ................. 235/462.37 |
| 2004/0026511 A1* | 2/2004 | Cheung ............... G06K 7/1443 235/462.1 |
| 2004/0211600 A1 | 10/2004 | Schuller et al. ........... 177/25.15 |
| 2008/0048044 A1* | 2/2008 | Zhao ...................... G06K 7/14 235/494 |
| 2008/0071618 A1 | 3/2008 | Weisz et al. ................... 705/14 |
| 2008/0156863 A1* | 7/2008 | Abrott ..................... B41J 29/26 235/375 |
| 2011/0290880 A1* | 12/2011 | Cai ......................... G06K 7/14 235/437 |
| 2012/0000714 A1 | 1/2012 | Wiesz et al. .............. 177/25.15 |
| 2012/0173351 A1 | 7/2012 | Hanson et al. ................. 705/17 |
| 2013/0133958 A1 | 5/2013 | Crooks ............................ 177/1 |
| 2014/0156376 A1 | 6/2014 | Sellers et al. ............ 705/14.38 |
| 2014/0262549 A1 | 9/2014 | Brouhard et al. ................ 177/1 |
| 2015/0025969 A1 | 1/2015 | Schroll et al. ............ 705/14.53 |

\* cited by examiner

SYSTEM AND METHOD OF ENCODING ITEM INFORMATION FROM A SCALE IN A SELF-SERVICE SCANNING SOLUTION

CROSS-REFERENCE TO RELATED APPLICATIONS

This application is a continuation of U.S. patent application Ser. No. 14/137,285, filed Dec. 20, 2013, which claims priority to U.S. Provisional Patent Application Ser. No. 61/798,633, filed Mar. 15, 2013, both of which are incorporated by reference herein in their entireties.

FIELD OF THE INVENTION

The invention relates to an enhanced bulk item mobile point of purchase solution for use in grocery and other retail applications.

BACKGROUND OF THE INVENTION

Smartphones are affecting every facet of the shopping experience, from getting people in the door, to helping them compare prices, and how they interact with other shoppers and their social network throughout the sale. Mobile shopping is breaking down the walls of traditional brick-and-mortar stores by giving shoppers the ability to easily find a cheaper price in a store down the street. Smart phone applications, such as Google Shopper, RedLaser and TheFind, allow shoppers to look up a product by scanning it or typing in the bar code.

However, bar codes are mostly used with manufactured goods or items that are packed and shelved for customers. Bar codes are useful with produce, agricultural goods, bulk goods, or similar items but cannot fully encode an item plus a weight since the weight of a bulk item is variable depending on a quantity purchased at the time of sale. Items that are loosely available are subject to being purchased in different quantities (weight or volume), making it difficult to pre-code them. For example, different shoppers may have desire different quantities of vegetables, making it difficult to encode the weight into a barcode or other machine readable code. Shoppers often weigh the picked loose items at an in-store scale to determine its price based on weight.

Thus, there exists a requirement for a system and method for a solution enabling the shopper to identify the item on their phone and then read the scale weight via a digital UPC/QR code of the weight.

SUMMARY OF THE INVENTION

The invention addressing these and other drawbacks relates to systems and methods of encoding item information from a scale in a self-service scanning solution. The system may comprise a scale and a display. The scale may be configured to weigh an item placed on the scale and encode a code related to the item that represents at least the weight of the item. The display may be coupled to the scale and configured to display the code related to the item.

In some implementations, the system may further comprise a mobile device configured to scan the display. The item that is weighed by the scale may include a produce or other bulk weighed items. In some implementations, the scale may be configured to encode the item in Quick Response (QR) code format, Universal Product Code (UPC) format, and/or other encoding that is machine readable. In some implementations, the display may be configured to display the code alphanumerically (e.g., in human-readable form). In some implementations, the scale may be configured to encode the item concurrently in one or more of a QR code, a UPC code, an alphanumeric code, and/or other format. Concurrent display of multiple types of codes enables built-in error correction to prevent bad decodes by camera barcode scanners. In some implementations, the system may further comprise a camera (separate from the camera barcode scanner) and an image processor. The camera may be configured to capture an image of the item. The image processor may be configured to encode the item based on the image of the item.

A method may comprise receiving an input weight of an item that is placed on a scale. The method may further comprise encoding the item placed on the scale, wherein the code comprises at least the weight of the item, and displaying the code. In some implementations, the method includes displaying the code in a format that may be scanned by a mobile application executing on a mobile device such as a smartphone. The method may include encoding the code in a Quick Response (QR) format, a Universal Product Code (UPC) format, and/or other encoding that is machine readable.

These and other systems, methods, objects, features, and advantages of the present invention will be apparent to those skilled in the art from the following detailed description and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE DRAWING FIGURES

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain aspects discussed in the present document. The devices described herein may be understood by reference to the following figures.

DETAILED DESCRIPTION OF THE INVENTION

Figure 1:
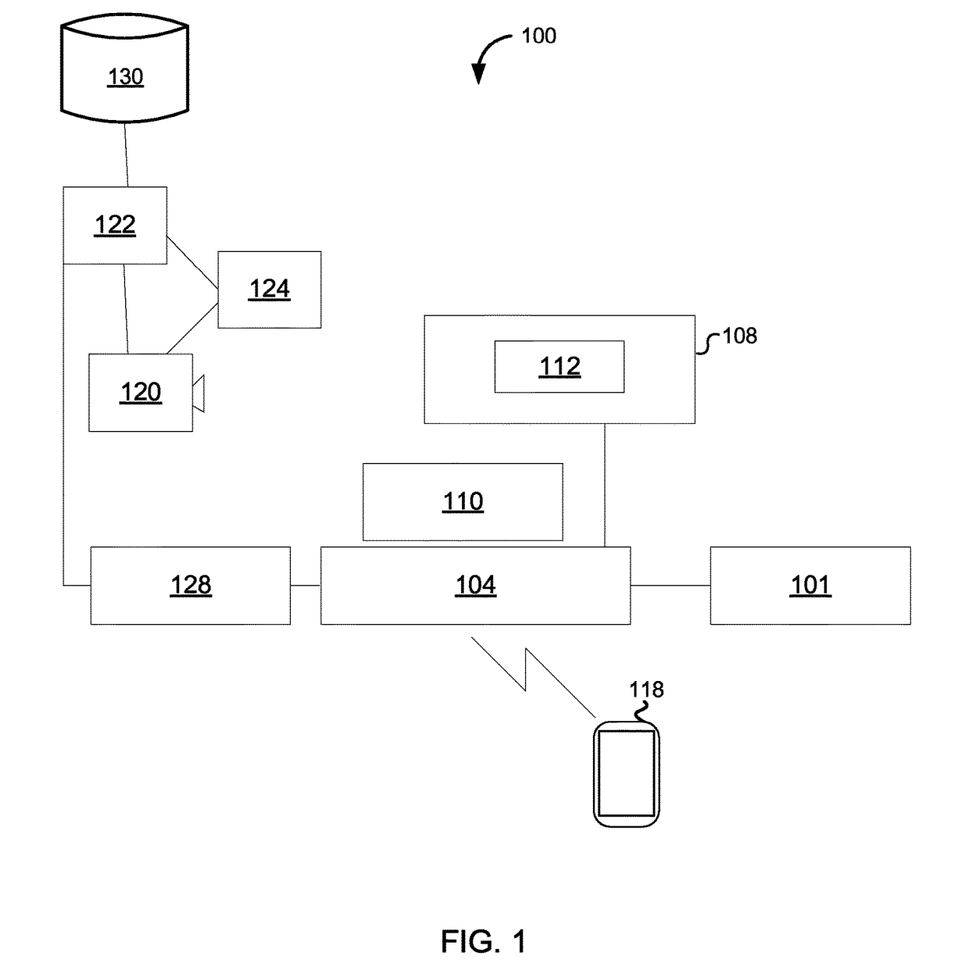
FIG. 1 illustrates a system for assigning codes to the weight of an item in a format compatible with a mobile device, according to an aspect of the invention.

FIG. 1 illustrates a system 102 for assigning codes to an item in a format compatible with a mobile device.

In some implementations, system 102 may include a scale 104 and a display 108. The scale 104 may be configured to weigh an item 110 placed on the scale 104. The scale 104 may be configured to encode at least the weight of the item 110 into a code 112. The scale 104 may include a coding facility 128 which may be used to generate the code 112. The display 108 may be coupled to the scale 104, and may be configured to display the code 112 of the item 110. The item 110 may include an item that may be purchased in different quantities by weight, volume, or unit number that is generally not pre-packaged such that the user may purchase a variable quantity of the item. For example, the item 110 may include an agricultural commodity such as produce, a bulk weighed item, a loosely available item, and/or other items that may be purchased in different quantities that is generally not pre-packaged.

The scale 104 may be coupled to the display 108 by any conventional electronic means. For example, the scale 104 may be connected to the display 108 by any conventional wired or wireless means. In some implementations, the display 108 may be in electrical communication with the scale 104, such as with a serial cable or wirelessly through a wireless communication protocol. The display 108 may be placed in a vicinity of the scale 104, such as on a stand, although other configurations may be used as well. The scale 104 may be configured to encode the weight of the item 110 into the code 112 such that the code 112 is in a format compatible to a software application embedded into a mobile device 118. Mobile device 118 may include an imaging device (not illustrated in the Figures) such as a camera or optical scanner that is able to take an image of code 112. The software application embedded into the mobile device 118 may be configured to recognize and decode the code 112 based on the image of the code to retrieve information encoded therein.

In some implementations, the code 112 displayed on the display 108 may be scanned by the mobile device 118 such that the code 112 may be decoded by the mobile device 118. In some implementations, the mobile device 118 may be a Smartphone, mobile shopping device, a mobile computer tablet or any other portable computer.

In some implementations, the scale 104 may receive or otherwise have access to information about the item 110 being weighed such as, for example, a number of units, volume, item name, unit price, date of manufacture, date of expiration, date of packaging, geographical location of harvesting in case of produce, taxonomic information, medical uses, other uses, recipes, and/or other information known about the item. The scale 104 may receive or access the information and/or an identity of the item 110 from mobile device 118, a scanned barcode affixed to the item 110 that encodes the information and is scanned at the scale 104, a manual input at the scale 104, and/or other source that can convey the information to scale 104. In some implementations, the scale 104 may communicate an identity of the item 110 to a remote device 101 (such as an in-store computer that maintains inventory and item information) and receive the information from the remote device 101. In some implementations, the scale 104 may encode into code 112 the information about item 110. The information about the item 110 encoded into the code 112 may include at least the weight of the item 110.

In some implementations, the scale 104 may be configured to generate the code 112 so that the code 112 may contain error correction and mask patterns. The error correction and the mask patterns may hold various levels of information thereby making the code 112 product specific. In some implementations, the code 112 may encode mask patterns and error correction so as to enable a specific level of service for a specific mobile device. For example, if a user subscribes for a service that may provide taxonomic data and medical uses of the item 110 placed on the scale 104, only then would the mobile device be able to decode the code 112 due to presence of certain specific mask patterns. The code 112 may be generated in a quick response (QR) Code format, a UPC format, and/or other format. In some implementations, the code 112 may be generated in accordance with various international standards including UPC-A to UPC-E standard, ISO (International Standards Organization) standard.

In some implementations, the scale 104 may be configured to encode only the weight of the item 110 into the code 112 and the item name may be added by the user onto the scale 104 or onto the mobile device 118. The scale 104 may encode the weight of the item 110 irrespective of product name of the item 110 so that the user may input or select the product name on the mobile device 118 for further processing. In some implementations, the code 112 may encode information related to only the weight of the item 110 and any further information may be retrieved from the mobile device 118 responsive to input of a product name or other identification of the item 110. The code 112 containing the weight may then be amalgamated with the information retrieved such that the cost of the item 110 may be calculated. In an example, a user purchasing bananas may place the bananas on the scale 104 to be weighed. The scale 104 may determine the weight of the bananas, generate a QR code that encodes the determined weight, and cause the QR code to be displayed on a display associated with the scale 104 (e.g., display 108). In this example, the user may first indicate in the application that they are purchasing bananas and the application may request the weight. The user may then scan the QR code that is displayed by the display 108 using a smartphone running the scan-and-bag (e.g., a self-service scanning) application to obtain the weight information. In another version of this example, the user indicates on the scale that bananas are being weighed and the code is generated with both item and weight information. In yet another version of this example, if the bananas are sold on a per unit basis instead of weight basis, the scale 104 may simply be used as a processor for generating code information. In this version of the example, the user may simply input item and number of item information and the code 112 may be generated with this information.

In some implementations, the scale 104 may be configured to communicate the weight and/or other information known about the item 110 to mobile device 118 using wired or wireless communication channels. In this implementation, the weight and/or other information may be communicated using a machine readable format, a human readable format, and/or other format that can be communicated using wired or wireless communication channels. For example, the scale 104 may wirelessly transmit the weight and/or other information known about the item 110 to mobile device 118.

In some implementations, the scale 104 may be configured to communicate the weight and/or other information known about the item 110 via one or more print instructions. For example, the scale 104 may communicate the print instructions to a printer that prints the weight and/or other information on a print medium such as paper.

In any event, the code 112 may further contain pricing information. For example, an in-store server may be queried for the price when the item is input to the scale or recognized using the integrated camera and associated software. The code 112 may also contain further information obtained from the in-store server, such as date of manufacture, date of expiration, date of packaging, geographical location of harvesting in case of produce, taxonomic information, medical uses, other uses, recipes, or a combination thereof.

In some implementations, the scale 104 may be configured to encode the information so that the code 112 can be interpreted by a scan-and-bag application that retrieves pricing information, coupons, discounts, and the like when the code 112 is scanned and the item is added to an inventory of items for purchase. When the code 112 is scanned, any of the information encoded may be displayed, such as weight, number of units, volume, item name, unit price, date of manufacture, date of expiration, date of packaging, geographical location of harvesting in case of produce, taxonomic information, medical uses, other uses, recipes, or a combination thereof.

In some implementations, the information such as coupon information, discount code, price information, or any allied information that may directly or indirectly affect the price of the item 110 may be encoded in the code 112. For example, real-time or pre-targeted offers may be applied automatically to the item when the code is generated. The price and related information may be communicated to the purchaser of the item when the purchaser may scan the code on the display 108 with the mobile device 118 and the software application embedded in the mobile device 118 can decode the code 112 to calculate at least the cost of the item 110 accordingly. In some implementations, the scale 104 may be configured to encode various details about the item 110 into the code 112 that can be retrieved by the software application embedded in the mobile device 118.

The code can be generated as a QR code, UPC code, alphanumeric code, or the like in an application-specific, hardware-specific, or user-specific manner. In some implementations, a shopper shopping with mobile device 118 configured as a handheld shopping device, such as the MC17 Retail Mobile Computer (Motorola; Schaumburg, Ill.), may request that the code be generated as a UPC symbol for scanning. In some implementations, a shopper shopping with mobile device 118 configured as a smartphone and a scan-and-bag application, such as Modiv Shopper (Modiv Media; Quincy, Mass.) may request that the code be generated as a QR code to be imaged by the phone.

In some implementations, the system 102 may include a camera 120 and an image processor 122. The camera 120 may be configured to capture an image 124 of the item 110. The image processor 122 may be configured to encode the item 110 based on the image 214 of the item 110. In some implementations, the image processor 122 may be configured to convert the image 124 into a format compatible with the coding facility 128 of the scale 104. The camera 120 may image the products on the scale to generate item and/or number of item information. The camera 120 may transmit the image to an in-store server to query a database 130, which may include a plurality of images of different items, using the image. Alternatively, the image may be transmitted to the server, which may run an object recognition application to interpret the image and return the item name.

In some implementations, the system 102 may include a configurable setting that determines which format to use. For example, scale 104 may switch between using a QR, a UPC, and/or other format based on the configurable setting. In some implementations, the scale 104 displays the item weight in human readable format regardless of which setting is used.

In operation, the mobile device 118 may be programmed with/execute a self-scan application (or "scan-and-bag" application) that generates a listing of scanned items. The self-scan application allows a shopper to scan items using the mobile device 118. The self-scan application may receive an identification of the item 110. The shopper may then place the item 110 onto the scale 104. The scale 104 may weigh the item 110 and communicate at least the weight of the item. The weight may be communicated by encoding at least the weight into a machine readable code. The scale 104 may display or print the machine readable code and the mobile device 118 may scan the display or printed medium and decode the machine readable code to obtain at least the weight of the item 110. The scale 104 may communicate at least the weight via a wired or wireless communication channel. Whichever method is used to communicate at least the weight from the scale 104 to the mobile device 118, the mobile device 118 may add the identification of the item and at least the weight to the list of scanned items.

Figure 2:
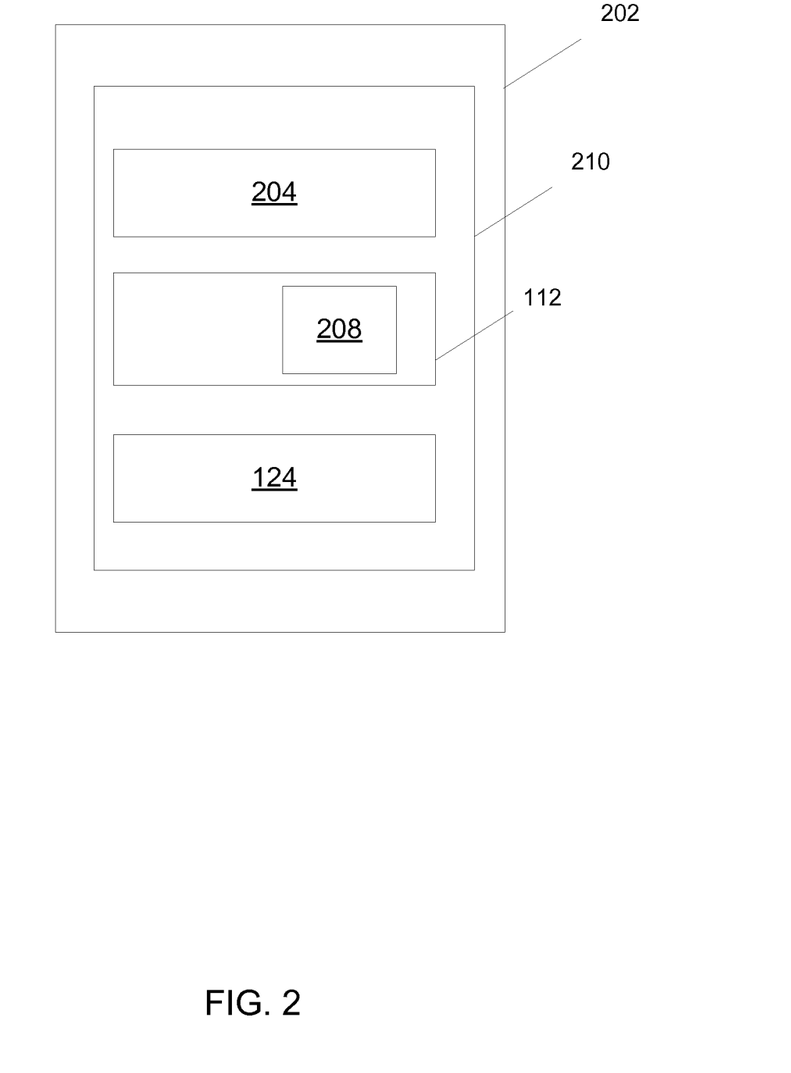
FIG. 2 illustrates a display configured to display a code encoded in a format compatible with a mobile device, according to an aspect of the invention.

FIG. 2 illustrates a display 202 of the system 102, according to an aspect of the invention. The display 202 illustrated in FIG. 2 may be electronically connected to the scale 104.

In some implementations, the scale 104 may be configured to communicate the information in a human readable format. For example, the scale 104 may display an alphanumeric code 204 via the display 202. In some implementations, the alphanumeric code 204 may be displayed along with an image of the code 112. The figure represents a QR code format, however, in aspects of the invention, any other code format may be used. Other code formats may include Universal Product Code (UPC), SnapTag, SPARQCode, Touchatag, Aztec Code, MaxiCode, Semacode and the like.

In some implementations, the code 112 may be encoded to contain an embellished pattern 208. The embellished pattern 208 may mark the code 112 to be generated at a specific location or brand. In some implementations, the embellished pattern 208 may mark the code 112 to be used for a specific purpose such as for aesthetics or for any other purpose.

In some implementations, the display 202 may include a screen 210 that displays analog or digital formats. Screen 210 may include an electronic-ink device (e.g., to facilitate machine-reading of the display 108 by laser scanners), a liquid crystal display device, and/or other type of conventional display device that can display the code 112 and/or other information. In some implementations, the display 202 may be configured to display the image 124 via the screen 210.

In some implementations, system 102 may be configured to communicate a promotional message such as an advertisement, offer, coupon, and/or other message intended to incent the customer to make a purchase. For example, the scale 104 may display the promotional message via display 202. The scale 104 may receive and store a general promotional message that may include items that are not targeted. The scale 104 may receive and store a specific promotional message. For example and without limitation, a specific promotional message may be one that promotes an item that is related to an item being weighed (if an identity of the item being weighed is known), an item that is in the same department or nearby where the scale 104 is located, and/or an item targeted for a shopper weighing an item at the scale (if an identity of the shopper is known).

Figure 3:
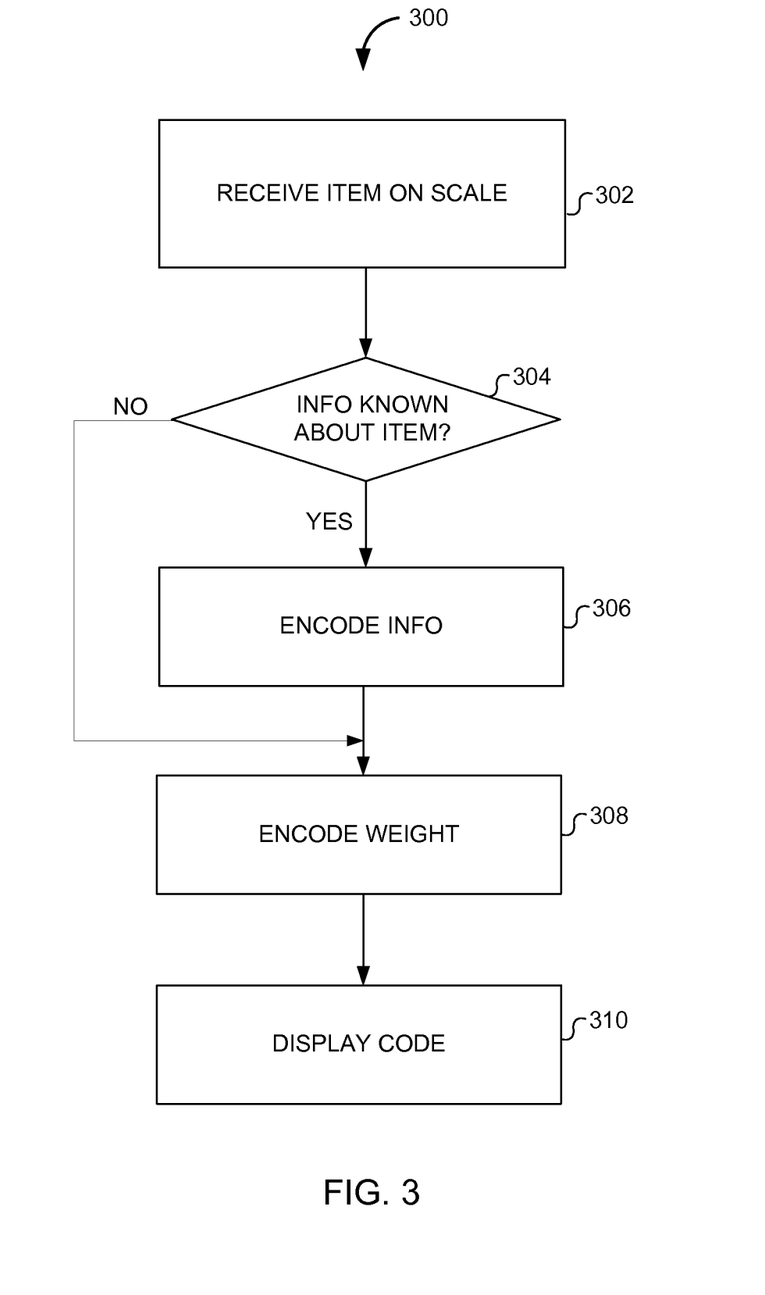
FIG. 3 illustrates a method for assigning bar codes to an item in a format compatible with a mobile device, according to an aspect of the invention.

FIG. 3 illustrates a method 302 for assigning a code to an item in a format compatible with a software application embedded in a mobile shopping device. FIG. 3 is explained in conjunction with FIGS. 1 and 2.

The method 302 may include the scale 104 to receive the input weight of the item 110. The method 302 may include the item 110 being placed on the scale 104 such that the code 112 comprises at least the weight of the item 110. The scale 104 may be configured to generate an image of the item 110 using the integrated camera 202 and an object recognition facility to recognize the item and match it to an item name in a database. In an some implementations, the scale may require the user to input the name information about the item 110 into the scale. In some implementations, the scale 104 may encode the weight of the item 110 irrespective of the name of the item 110 so that the user may input or select the name of the item 110 on the mobile device 118 for further processing.

In some implementations, the method 302 may include displaying the code generated as described above. In some implementations, the code 112 may be displayed using the display 108 and/or the display 202.

Described herein is a system and a method for providing bar codes to commodities that are not pre-packaged at the manufacturing site and in cases where weight of the commodity in question varies based on user requirement and choice.

Detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather to provide an understandable description of the invention.

The terms "a" or "an," as used herein, are defined as one or more than one. The term "another," as used herein, is defined as at least a second or more. The terms "including" and/or "having", as used herein, are defined as comprising (i.e., open transition). The term "coupled" or "operatively coupled," as used herein, is defined as connected, although not necessarily directly and mechanically.

The methods and systems described herein may be deployed in part or in whole through a machine that executes (e.g., is programmed by) computer software, program codes, and/or instructions on a physical processor. The processor may be part of a server, cloud server, client, network infrastructure, mobile computing platform, stationary computing platform, or other computing platform. The various processors described herein may include physical processors that may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some implementations, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, cloud servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, cloud servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with various aspects shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A handheld device programmed with a self-scan program that generates information relating to scanned items in a self-scanning checkout system, comprising:
    an imaging device; and
    a processor coupled to the imaging device, the processor configured programmed by one or more computer program instructions to:
        receive an identification of an item that is to be weighed;
        read, via the imaging device, a machine readable code communicated from a scale, the machine readable code comprising a mask pattern associated with a service specific to the item and encoding information relating to the item comprising a weight of the item that is measured by the scale;
        determine at least the weight of the item based on the machine readable code; and
        add the identification of the item and the weight to a listing of scanned items.

2. The handheld device of claim 1, wherein the imaging device comprises an integrated camera device.

3. The handheld device of claim 2, wherein to read the machine readable code, the processor is programmed to take a picture, via the integrated camera device, of a display screen associated with the scale and decode the machine readable code from the picture.

4. The handheld device of claim 1, wherein the machine readable code comprises a Quick Response (QR) code.

5. The handheld device of claim 1, wherein the machine readable code comprises a Universal Product Code (UPC).

6. The handheld device of claim 1, wherein the machine readable code comprises a SnapTag, SPARQCode, Touchatag, Aztec Code, MaxiCode, or Semacode format.

7. The handheld device of claim 1, wherein the processor is further programmed to obtain a discount off a price of the item based on the machine readable code.

8. The handheld device of claim 1, wherein the processor is further programmed to cause the identification of the item to be transmitted, via a wireless communication channel, to the scale.

9. The handheld device of claim 1, wherein to receive the identity of the item, the processor is programmed to decode a second machine readable code affixed to or associated with the item.

10. The handheld device of claim 1, wherein to receive the identity of the item, the processor is programmed to decode the identity of the item from the machine readable code.

11. A method for scanning weight information, the method being implemented by a handheld device having an imaging device and one or more physical processors programmed with computer program instructions that, when executed by the one or more physical processors, programs the handheld device to perform the method, the method comprising:
    receiving, by the handheld device, an identification of an item that is to be weighed;
    reading, by the handheld device, via the imaging device, a machine readable code communicated from a scale, the machine readable code comprising a mask pattern associated with a service specific to the item and encoding information relating to the item comprising a weight of the item that is measured by the scale;
    determining, by the handheld device, at least the weight of the item based on the machine readable code; and
    adding, by the handheld device, the identification of the item and the weight to a listing of scanned items.

12. The method of claim 11, wherein the imaging device comprises an integrated camera device.

13. The method of claim 12, wherein reading the machine readable code comprises taking, by the handheld device, a picture, via the integrated camera device, of a display screen associated with the scale and decoding the machine readable code from the picture.

14. The method of claim 11, wherein the machine readable code comprises a Quick Response (QR) code.

15. The method of claim 11, wherein the machine readable code comprises a Universal Product Code (UPC).

16. The method of claim 11, wherein the machine readable code comprises a SnapTag, SPARQCode, Touchatag, Aztec Code, MaxiCode, or Semacode format.

17. The method of claim 11, the method further comprising:
    obtaining, by the handheld device, a discount off a price of the item based on the machine readable code.

18. The method of claim 11, the method further comprising:
    causing, by the handheld device, the identification of the item to be transmitted, via a wireless communication channel, to the scale.

19. The method of claim 11, wherein receiving the identity of the item comprises:
    decoding, by the handheld device, a second machine readable code affixed to or associated with the item.

20. A non-transitory machine-readable storage medium comprising machine-readable instructions for causing a processor to execute a method for scanning weight information, the method comprising:
- receiving, by a handheld device, an identification of an item that is to be weighed;
- reading, by the handheld device, via an imaging device of the handheld device, a machine readable code communicated from a scale, the machine readable code comprising a mask pattern associated with a service specific to the item and encoding information relating to the item comprising a weight of the item that is measured by the scale;
- determining, by the handheld device, at least the weight of the item based on the machine readable code; and
- adding, by the handheld device, the identification of the item and the weight to a listing of scanned items.

* * * * *